US007673522B2

(12) United States Patent
Ryser et al.

(10) Patent No.: US 7,673,522 B2
(45) Date of Patent: Mar. 9, 2010

(54) FORCE-REDUCED MEASURING METHOD FOR TRACTION DRIVES, PARTICULARLY FRICTION PULLEY DRIVES FOR ELEVATORS

(75) Inventors: Hans Ryser, Berlin (DE); Martin Fiedler, Leipzig (DE)

(73) Assignee: TUV Rheinland Industrie Service GmbH, Cologne (DE)

( * ) Notice: Subject to any disclaimer, the term of this patent is extended or adjusted under 35 U.S.C. 154(b) by 524 days.

(21) Appl. No.: 11/570,644

(22) PCT Filed: Jun. 14, 2005

(86) PCT No.: PCT/EP2005/006332

§ 371 (c)(1),
(2), (4) Date: Jan. 11, 2007

(87) PCT Pub. No.: WO2005/123561

PCT Pub. Date: Dec. 29, 2005

(65) Prior Publication Data

US 2008/0271547 A1 Nov. 6, 2008

(30) Foreign Application Priority Data

Jun. 17, 2004 (DE) ....................... 10 2004 029 133

(51) Int. Cl.
*G01N 3/02* (2006.01)

(52) U.S. Cl. .......................................... 73/856; 73/760

(58) Field of Classification Search ............ 73/760–860
See application file for complete search history.

(56) References Cited

U.S. PATENT DOCUMENTS

| | | | | |
|---|---|---|---|---|
| 3,585,941 | A * | 6/1971 | Primo | 104/173.1 |
| 3,901,207 | A * | 8/1975 | Remaud | 123/198 DB |
| 4,145,963 | A * | 3/1979 | Leslie et al. | 100/4 |
| 4,555,091 | A * | 11/1985 | May et al. | 254/267 |
| 4,850,242 | A * | 7/1989 | Hass et al. | 74/512 |
| 5,233,139 | A | 8/1993 | Hofmann | |
| 5,731,528 | A * | 3/1998 | Yamazaki et al. | 73/862.41 |
| 5,832,784 | A * | 11/1998 | McCallips et al. | 74/512 |
| 6,206,053 | B1 * | 3/2001 | Hillegonds | 140/123.6 |
| 6,471,032 | B2 * | 10/2002 | Busschaert et al. | 198/312 |

FOREIGN PATENT DOCUMENTS

| | | |
|---|---|---|
| DE | 4211289 | 10/1993 |
| DE | 4311011 | 1/1994 |
| EP | 0390972 | 10/1990 |
| EP | 0563836 | 3/1993 |
| WO | WO 2004/103880 A1 | 12/2004 |

* cited by examiner

*Primary Examiner*—Max Noori
(74) *Attorney, Agent, or Firm*—Gifford, Krass, Sprinkle, Anderson & Citkowski, P.C.

(57) ABSTRACT

The invention relates to a test lever system (1) for monitoring the traction behavior of a transport system (2), particularly an elevator system, comprising a test lever (8) which consists of a load arm (14) and a force arm (13). A discharge in the form of a monitoring force is introduced by means of the test lever (8), via a carrier cable securing device, into a cable which is to be tested.

16 Claims, 3 Drawing Sheets

FORCE-REDUCED MEASURING METHOD FOR TRACTION DRIVES, PARTICULARLY FRICTION PULLEY DRIVES FOR ELEVATORS

FIELD OF THE INVENTION

The present invention pertains to a test lever system for testing the traction behavior of a transport system, particularly an elevator system.

BACKGROUND OF THE INVENTION

The traction behavior of elevator systems needs to be tested at regular intervals in order to ensure the safety of the system. To this end, for example, EP 39 09 72 B1 describes a method in which a distance sensor is used for measuring physical parameters that are determined in correlation with a motion sequence of the elevator by means of an evaluation unit. The method of the present invention should also make it possible, in particular, to obtain information on the slipping resistance of the cable driven by a friction pulley.

SUMMARY OF THE INVENTION

The present invention is based on the objective of making it possible [to test] the traction behavior of a transport system, particularly an elevator system, by means of a test lever system.

This objective is attained with a test lever system with the characteristics of Claim 1, with a method with the characteristics of Claim 5 and with a data carrier with a computer program for a method with the characteristics of Claim 5 or for a test lever with the characteristics of Claim 1. Other advantageous embodiments and additional developments are disclosed in the respective dependent claims.

BRIEF DESCRIPTION OF THE DRAWINGS

Other advantageous embodiments and additional refinements are specified in the following figures. However, the characteristics are not limited to the individual embodiments. On the contrary, these characteristics can be combined with earlier-described characteristics in order to realize additional refinements. Shown are.

DETAILED DESCRIPTION OF THE PREFERRED EMBODIMENTS

Figure 1:
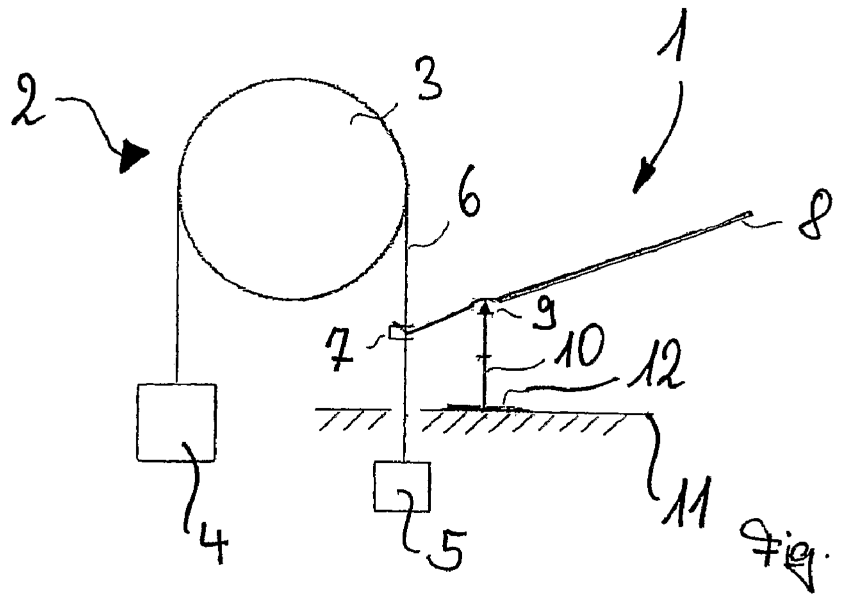
FIG. 1, a test lever system on a transport system.

The invention provides a test lever system for testing the traction behavior of a transport system, particularly an elevator system, in which the test lever system features a test lever with a load arm and a force arm, a carrying cable securing device with a receptacle for the load arm of the test lever, and a support for supporting the test lever, wherein the test lever system is realized in such a way that the interaction between the load arm and the carrying cable securing device causes relief of a carrying means to be tested, for example a cable, when a test force is exerted upon the force arm. It is also possible to test driving means other than a cable, such as chains, bands, belts or the like. The carrying means is subjected, in particular, to a test force in the form of relief by means of the test lever system.

The support for supporting the test lever serves, in particular, for creating a fixed point. This fixed point is at least connected to a hinge point and/or a fulcrum for the test lever. For example, the test lever may feature an element that is compatible with the support and not only creates a connection between the support and the test lever, but preferably also secures this connection. The support may simultaneously form the hinge point and the fulcrum.

This makes it possible to test, in particular, passenger elevators, warehouse elevators, freight elevators, building elevators, service elevators, passenger lifting mechanisms as well as other traction drives. The test lever system is particularly suitable for elevators that feature a friction pulley, around which a carrying means, particularly one or more cables, is at least partially guided, wherein an elevator car is suspended on one end of the carrying means and a counterweight is suspended on the other end. The test lever system can also be used in machines with an endless carrying means that is guided and driven by means of pulleys.

Embodiments of the invention are described below with reference to examples featuring one or more carrying cables. However, these embodiments can also be realized with other carrying means.

According to one additional development, the carrying cable securing device simultaneously encompasses a multitude of carrying cables. This makes it possible to perform a comprehensive functional test of all carrying cables. Alternatively, it is also possible to test only one individual carrying cable or to simultaneously test only a few selected carrying cables. The carrying cable securing device preferably can be separably arranged on the cable to be tested. Depending on the system, the carrying cable securing device may also be permanently connected to the cable to be tested, particularly in an inseparable fashion. The carrying cable securing device makes it possible, in particular, to exert a force upon the cables to be tested in such a way that a uniform relief of all cables is achieved. To this end, the carrying cable securing device makes it possible, in particular, to relieve the carrying cables in parallel. This can be realized, for example, with a carrying cable securing device that is composed of several parts. This makes it possible to utilize and secure the carrying cable securing device on the carrying cables differently depending on the respective installation conditions.

The support serving, for example, as a fulcrum for the test lever preferably forms part of a telescopic support. The leg region of such a telescopic support makes it possible to ensure that the test lever system is sufficiently stable and supported in a non-slip fashion. In addition, the height of the support can be adjusted with such a telescopic support. The height of the support can be adjusted with respect to the installation conditions of the elevator system, as well as with respect to the ease of operation. For example, the telescopic support may feature a leg region with a three-point support, wherein each of these support points can be adjusted individually. Another option consists of mounting the telescopic support on installations or similar stationary structures. This can be realized, for example, with the aid of screws, clamps or the like.

A suitable test lever is disclosed, for example, in DE 103 231 75, the content of which with respect to the design of the test lever, with respect to the sensors used, with respect to test lever attachments and with respect to devices connected to the test lever is hereby incorporated into the disclosure of the present application by reference in its entirety.

The test lever system may be realized, in particular, in the form of a mobile system. It is preferred that the test lever system can be stowed in a single carrying case. This enables an individual inspector to transport the test lever system to the test site. In addition, an individual inspector is able to test a transport system of this type without requiring further assistance. The invention proposes, in particular, that the carrying case accommodate the test lever, the carrying cable securing device and the telescopic support, as well as the tools required for the assembly of the system. A transmitting/receiving unit, a data storage unit and/or a mobile computer can also be accommodated in the carrying case.

According to another embodiment, the dimensions of the test lever are variable. This variability makes it possible to adapt the test force to be exerted to the inspector utilizing the test lever. Due to this measure, excessively high test forces are not required for the traction measurement. On the contrary, it suffices to subject the test lever to the forces exerted by the hand of a person.

According to another aspect of the invention, a method is provided for testing the traction behavior of a transport system, particularly an elevator system. The method is carried out with a test lever that is secured on at least one carrying cable on a carrying means side and causes relief of the carrying cable when a test force is exerted upon the test lever. In this case, the carrying means side is the side that is connected to a cage, an elevator car or another device for transporting a load.

A carrying cable securing device is preferably attached to the carrying cable to be tested, wherein the test lever engages into the carrying cable securing device in order to exert the test lever force. The test lever force causes relief of the carrying cable. This makes it possible to determine whether the respective system has a sufficient traction behavior, namely by increasing the test force until a minimum value is reached without causing the carrying cable being tested to slip. It is therefore also possible, in particular, to test a multitude of carrying cables or all carrying cables simultaneously. To this end, the carrying cable securing device is fixed, for example, on a multitude of carrying cables and these carrying cables are subsequently relieved by means of the test lever. It is preferred that all carrying cables be relieved equally. However, is also possible to realize varying relief by exerting different forces upon the carrying cables.

According to one additional development, the test force is measured and a positive measurement is automatically acknowledged when a predetermined test force is reached. A positive measurement is defined in that a previously input or calculated minimum force is established. A sufficient traction behavior of the transport system and therefore a positive measurement is acknowledged if this minimum force is reached or exceeded during the measuring process. It is therefore preferable to determine the minimum force to be exerted upon the specific system by means of the test lever before the test is carried out.

According to another aspect of the invention, a data carrier with a computer program is provided for a method for testing the traction behavior of a transport system, particularly an elevator system, and/or for a test lever of the above-described type. The data carrier preferably forms part of a data-processing unit, particularly a mobile computer. The computer program contains an algorithm that makes it possible to determine the traction behavior based on at least one of the following parameters: safety constant, carrying capacity of an elevator car, counterweight, number of carrying means, particularly carrying cables, and/or transmission ratio of the suspension. In this case, the minimum force for relief of at least one carrying cable is calculated in order to test the traction behavior.

The transmission ratio of the suspension describes the arrangement of carrying means, particularly carrying cables, relative to a drive and their attachment to stationary structures. Consequently, the minimum force for realizing relief of either one or all carrying cables can be determined with a corresponding safety margin beforehand for each specific transport system with the aid of a formula. This value of the minimum force may also be input into the test lever, particularly transmitted thereto automatically, for example via a radio link. If designed accordingly, the test lever may display whether or not the required minimum force for acknowledging a positive measurement was reached while the test lever was subjected to the test force. In this case, the minimum force may also be subject to a safety margin. It may also be stipulated that the minimum force needs to be exerted over a minimum time period (see script, page 4 below). This enables the inspector to estimate when a measurement can be aborted at the test site. The invention furthermore proposes that information on the measurement can be recorded and stored, particularly by means of the test lever. These measuring values, in particular, may also be evaluated directly or transmitted to an evaluation unit. The transmission can be realized, for example, via a corresponding interface on the test lever or a radio link. This makes it possible, in particular, to automate the evaluation such that not only an individual measurement, but also a multitude of individual measurements can be correlated. In addition, long-term behavior can be generated from the accumulated data.

FIG. 1 schematically shows an exemplary test lever system 1 for a transport system 2. The transport system 2 features a friction pulley 3, wherein a counterweight 4 is secured on one side of said friction pulley and an elevator car 5 to be moved is secured on the other side of the friction pulley with the aid of a carrying means, particularly in the form of a carrying cable 6.

A fixing element in the form of a first carrying cable securing device 7 is arranged on the carrying means side of the carrying cable 6. The first carrying cable securing device 7 on the carrying cable 6 preferably can be attached in a non-destructive fashion and removed again after the measurement. A test lever 8 can engage into the first carrying cable securing device 7. To this end, the test lever 8 may have a corresponding shape. The test lever 8 is supported on a support 9 for the test lever 8 that forms a fulcrum for the test lever S. The support 9 is preferably arranged on a telescopic support 10, wherein the telescopic support 10 features a leg region 12 that can be adapted to the respective floor space 11. The test lever 8 may have, in particular, such a geometry that the support 9 is prevented from slipping relative to the test lever 8. The support 9 divides the test lever 8 into a load arm 14 and a force arm 13.

Figure 2:
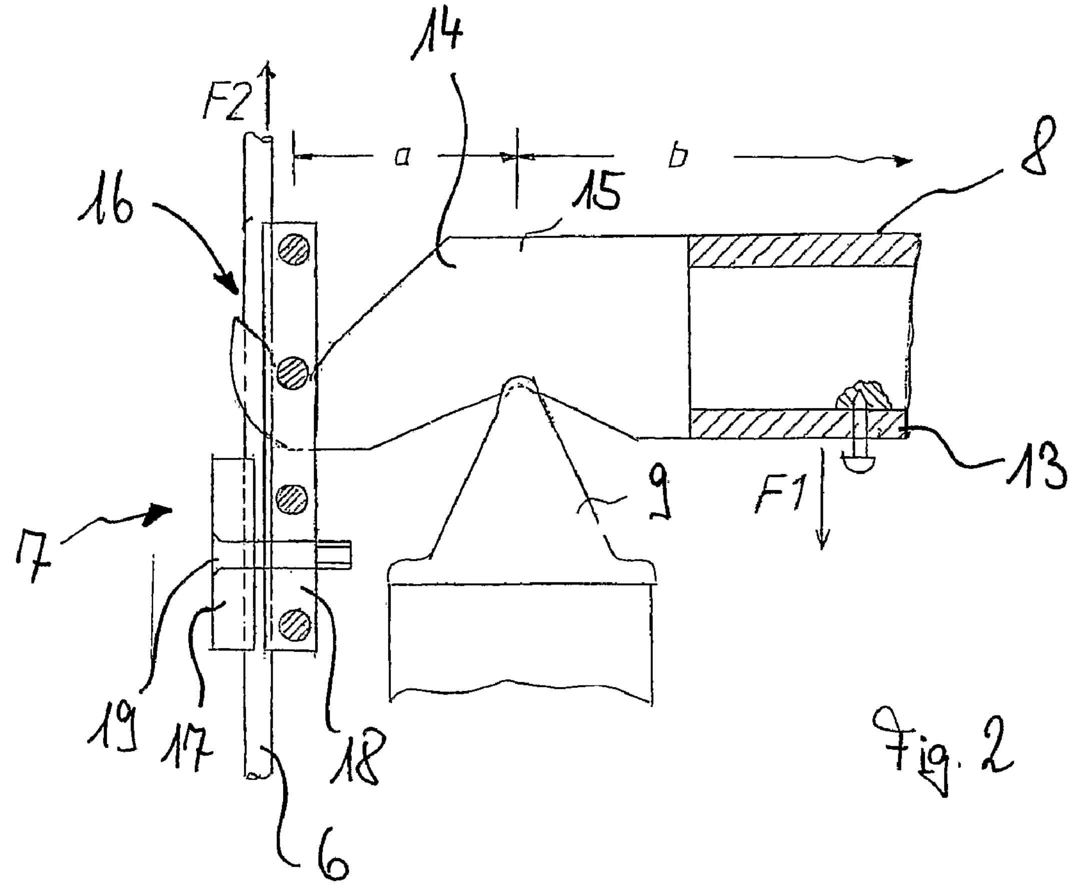
FIG. 2, an enlarged detail of FIG. 1 with a first cable securing device.

FIG. 2 shows an enlarged detail of FIG. 1, in which the test lever 8 rests on the support 9. The force arm 13 and the load arm 14 make it possible to divide the test lever 8 into a load lever a and a force lever b. For this purpose, the test lever 8 features, in particular, a test lever head section 15, for example, of the type described in DE 103 23 175 that is incorporated into the disclosure of the present application by reference in its entirety. The first carrying cable securing device 7 features a receptacle 16 for the load arm 14. The geometry of the load arm 14 is preferably realized such that it is able to engage into the receptacle 16. To this end, the load arm 14 can be connected, particularly in a separable fashion, to the first carrying cable securing device 7, e.g., by means of a screw connection, a clamping connection or a snap-on connection. Due to this measure, the first carrying cable securing device 7 may also serve as a guideway, preferably a bearing, for the test lever 8. The first carrying cable securing device 7 may be constructed in the form of a clamping system or a screw-type system and consist of a first component 17 and a second component 18. These components can be connected to one another, for example, with a screw system 19 in order to exert a clamping force on the carrying cable 6. The carrying cable 6 can be subjected to a lever force F2 by exerting a manual force F1. The support 9 forms a fulcrum for the test lever 8 and the attached test lever head section 15. The manual force F1 is increased in accordance with the transmission ratio b/a and is exerted upon the carrying cables 6. The test lever detects the instantaneous force in the load arm, preferably by means of integrated evaluation electronics. However, it is also possible to forward measuring values to an evaluation unit realized separately of the test lever 8 via an interface in order to obtain information on the measurement or other parameters.

Figure 3:
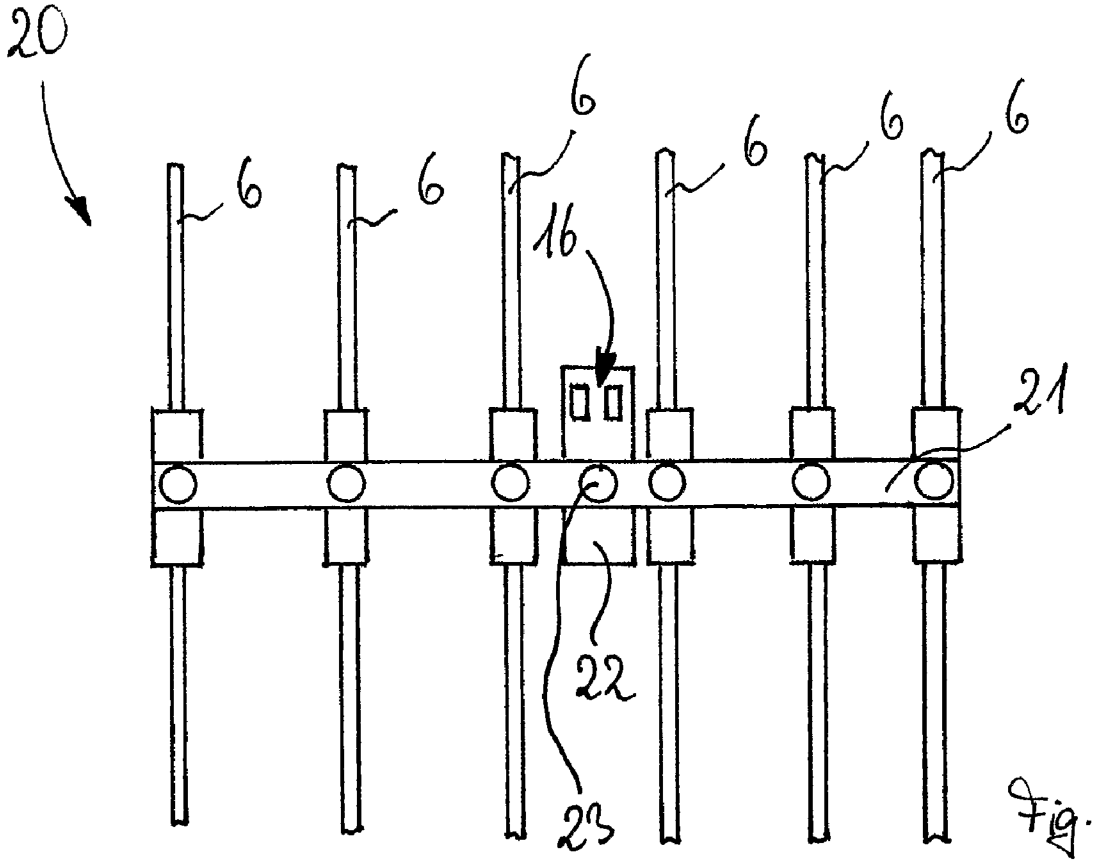
FIG. 3, a second cable securing device.

FIG. 3 shows a second carrying cable securing device 20 that was mounted on a multitude of carrying tables 6. A bridge element 21 extends over the carrying cables 6, wherein each carrying cable 6 is individually connected to the bridge element 21. This is preferably realized with a screw system, for example, according to FIG. 2. The bridge element 21 can be balanced in such a way that all carrying cables 6 are equally relieved when a force is exerted via the bridge element 21. To this end, the bridge element 21 features a coupling element 22 that is arranged, in particular, in a displaceable or variable fashion. For example, the coupling element 22 features a receptacle 16 for a load arm of the test lever. The receptacle 16 may be realized, for example, such that the test lever engages therein in a prong-like fashion. The coupling element 22 is adjusted by means of an adjusting device 23, for example, with respect to its height as well as along the bridge element 21 such that the force is exerted uniformly. The coupling element 22 may also be arranged on the other side of the bridge element 21 referred to the carrying cables 6. Due to this measure, the test lever is able to engage centrally on an odd number of carrying cables that are equidistantly spaced apart from one another.

Figure 4:
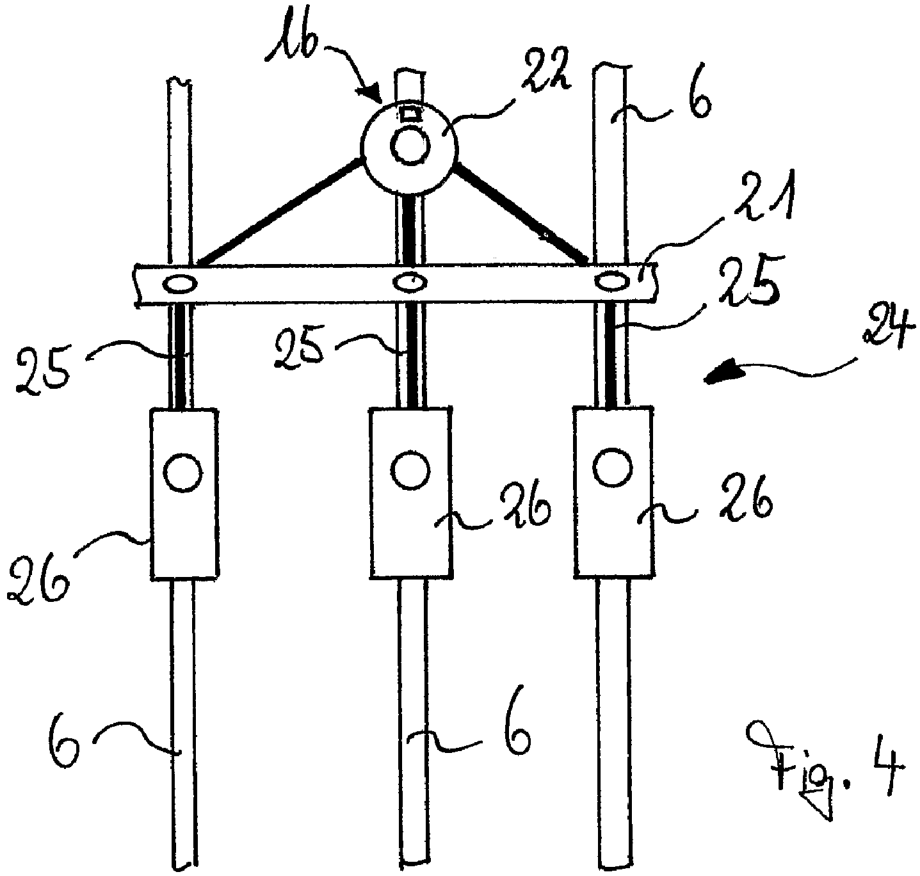
FIG. 4, a third cable securing device.

FIG. 4 shows a third carrying cable securing device 24. Three carrying cables 6 are coupled to one another by means of the bridge element 21. However, the coupling element 22 with the receptacle 16 connects force transmitting means 25 to one another in such a way that the carrying cables 6 can be relieved equally. In this case, the bridge element 21 serves as the force transmitting means because it supports lateral forces and only makes it possible to exert the test force for relief of the carrying cables 6 via the connecting means 26 that clamp the carrying cables 6, in particular, in order to realize the transmission of the test force and said relief.

Figure 5:
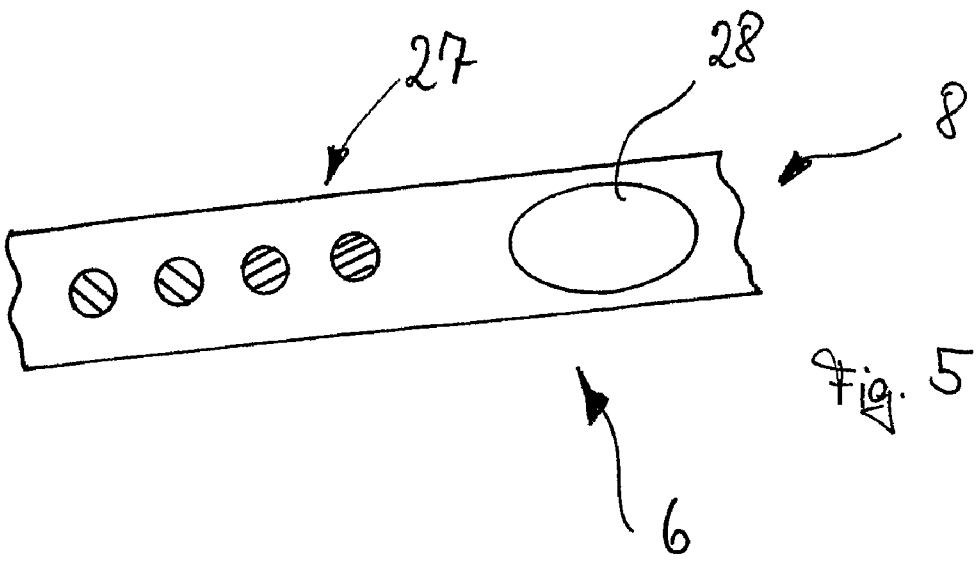
FIG. 5, a detail of a test lever.

FIG. 5 shows a detail of the test lever 8. For example, signaling means 27 are arranged on the test lever 8. These signaling means may consist, for example, of LEDs that make it possible to indicate whether a minimum force exerted upon the test lever is already reached or said minimum force was not yet reached and the traction behavior therefore cannot be acknowledged yet. In addition to a display option, for example, in the form of the signaling means 27, the test lever 8 may also feature an input option 28. Data may be input, for example, with the aid of a keypad or other control panels. It is possible, in particular, to select from a pre-installed menu, particularly a pre-installed menu for specific transport systems that contains the predetermined minimum forces to be reached. The test lever 8 may furthermore feature one or more interfaces for wire-bound or wireless data transmission.

Figure 6:
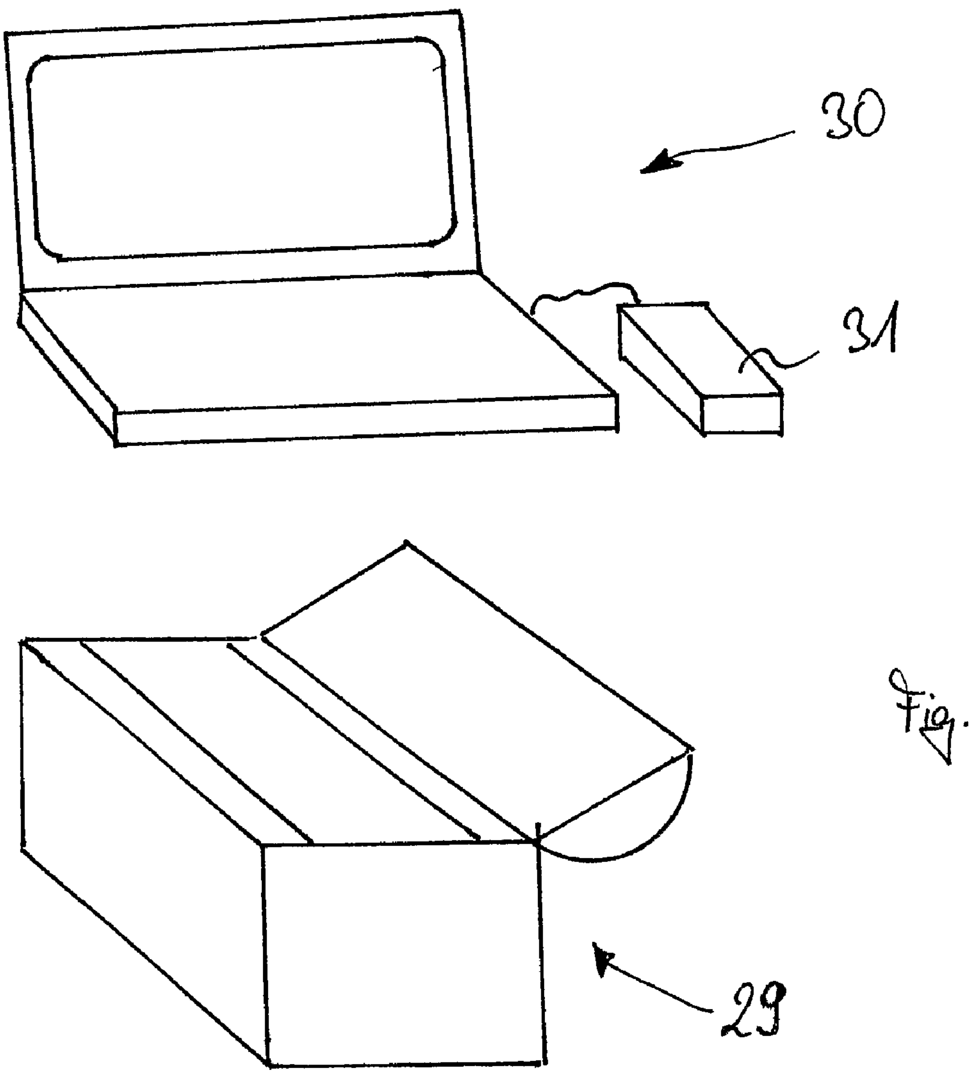
FIG. 6, an overview of a compact mobile test lever system.

FIG. 6 schematically shows an example of a carrying case 29. The components of the test lever system can be accommodated in the carrying case 29 in such a way that an individual operator is able to transport the test lever system to the test site, as well as assemble the system and carry out a functional test of the traction behavior of the transport system. For example, the test lever, a base for the support, particularly in the form of a telescopic support, at least one carrying cable securing device, the corresponding tools and other materials can be accommodated in the carrying case 29. The system may also comprise, for example, a mobile data-processing device 30. A radio transmitter 31 may be assigned to this data-processing device. This radio transmitter makes it possible to realize the remote transmission of data recorded on the respective transport system with the aid of the test lever system. Consequently, other data, measuring sequences and the like can be recorded and stored. In addition, information on the long-term behavior of the transport system can be obtained in this fashion. This furthermore makes it possible to estimate the presumed future state of the transport system. Before the test begins, a stored program is able to determine the minimum force to be reached in each specific transport system during the test of its traction behavior. This value can be transmitted to the test lever via an interface or in a wireless fashion and stored therein. During the subsequent test, the value that is specifically adapted to the respective transport system can be monitored while the manual force is exerted and the exceeding of this minimum value can be displayed accordingly.

The invention makes it possible to test the traction behavior of different mechanical systems, particularly transport systems or elevator systems in which system components are moved in the horizontal, vertical or any arbitrary direction by means of one or more drive elements. The present invention can be used, in particular, for testing transport systems or machines, particularly elevator systems in which significantly higher carrying or tractive forces occur and which could only be tested with extremely large and therefore heavy test equipment until now. The test can be carried out in a time-efficient fashion due to the ability to test individual carrying means, for example carrying cables, as well as several carrying means or an entire carrying means suspension simultaneously.

The invention claimed is:

1. A test lever system for testing a traction behavior of a transport system of an elevator system by relieving a load on the elevator system, the test lever system comprising:

a test lever, said test lever having a fulcrum point and a load arm on one side of said fulcrum point and a force arm on an opposite side of said fulcrum point;

a carrying means securing device having a receptacle, said securing device operative to attach to the elevator system; and a support located at said fulcrum point of said test lever;

wherein said securing device is attached to the elevator system;

said load arm engages said receptacle of said carrying means securing device, thereby engaging said test lever with the elevator system;

said support supports said test lever at said fulcrum point; and exertion of a test force on said force arm decreases a load on the elevator system, for the purpose of testing the traction behavior of the transport system of the elevator system.

2. The test lever system according to claim 1, characterized in that said support is a telescopic support.

3. The test lever system according to claim 1, further comprising a clamping device for said carrying means securing device and a carrying means of the elevator system, said clamping device of said carrying means securing device operative to attach said carrying means securing device to said carrying means of the elevator system.

4. The test lever system according to claim 1, further comprising a carrying case;

wherein said test lever, said carrying means securing device and said support can be stowed in said carrying case.

5. The test lever system according to claim 1, characterized in that said carrying means securing device is a carrying cable securing device attached to a carrying cable.

6. The test lever system according to claim 1, characterized in that said carrying means securing device is a carrying cable securing device attached to a multitude of carrying cables.

7. A method for testing a traction behavior of a transport system of an elevator system by relieving a load on the elevator system, the method comprising:

providing a test lever having a fulcrum point with a load arm on one side of said fulcrum point and a force arm on an opposite side of said fulcrum point;

providing a carrying means securing device with a receptacle, the securing device operative to attach to the elevator system and the receptacle operative to engage the load arm of the test lever;

providing a support operative to support the test lever at the fulcrum point;

attaching the carrying means securing device to the elevator system;

engaging the receptacle of the carrying means securing device with the load arm of the test lever, thereby engaging the test lever with the elevator system;

supporting the test lever at the fulcrum point using the support;

exerting a test force on the force arm of the test lever, the test force on the force arm reducing a force on the elevator system for the purpose of testing the traction behavior of the transport system of the elevator system.

8. The method according to claim 7, further including providing a clamping device for the carrying means securing device and a carrying means of the elevator system, and attaching the carrying means securing device to the carrying means using the clamping device.

9. The method according to claim 7, characterized in that the test force is measured and a positive measurement is automatically acknowledged when a predetermined minimum force is at least reached.

10. The method according to claim 7, characterized in that a predetermined minimum force to be exerted to the carrying means securing device is determined before the test.

11. The method of according to claim 8, characterized in that the carrying means securing device is a carrying cable securing device and the carrying means is a carrying cable.

12. The method of according to claim 8, characterized in that the carrying means securing device is a carrying cable securing device and the carrying means is a multitude of carrying cables.

13. The method according to claim 7, further including a data-processing device with a computer program, the computer program having an algorithm calculating the traction behavior of the transport system of the elevator system.

14. The method of claim 13, further including calculating a predetermined minimum force for the carrying means to realize a predetermined amount of relief.

15. The method according to claim 13, characterized in that the algorithm uses a parameter to calculate the traction behavior, the parameter selected from the group consisting of a safety constant, a system constant, a carrying capacity of an elevator car, a weight of a counterweight, a number of carrying means, a transmission ratio of suspension and combinations thereof.

16. The method of claim 13, characterized in that the data-processing device is a mobile computer.

* * * * *